United States Patent [19]

Isobe

[11] Patent Number: 5,341,352
[45] Date of Patent: Aug. 23, 1994

[54] DISK PLAYER FOR PLAYING BACK MORE THAN ONE KIND OF DISK

[75] Inventor: Nobuyuki Isobe, Saitama, Japan

[73] Assignee: Pioneer Electronic Corporation, Tokyo, Japan

[21] Appl. No.: 5,188

[22] Filed: Jan. 14, 1993

Related U.S. Application Data

[63] Continuation of Ser. No. 650,382, Feb. 4, 1991, abandoned.

[30] Foreign Application Priority Data

May 22, 1990 [JP] Japan .................. 2-130260

[51] Int. Cl.⁵ .................................. G11B 17/03
[52] U.S. Cl. ...................... 369/37; 369/194; 369/197; 369/270
[58] Field of Search .................. 369/36, 37, 38, 39, 369/75.1, 75.2, 191, 194–196, 197, 265, 270, 34

[56] References Cited

U.S. PATENT DOCUMENTS

| | | | |
|---|---|---|---|
| 4,337,533 | 6/1982 | Ando et al. | 369/75.2 |
| 4,566,087 | 1/1986 | Kraft | 369/37 X |
| 4,644,515 | 2/1987 | Allebest et al. | 369/36 X |
| 4,670,866 | 6/1987 | Hasegawa et al. | 369/37 X |
| 4,722,078 | 1/1988 | Nakanishi et al. | 369/197 |
| 4,755,978 | 7/1988 | Takizawa et al. | 369/194 |
| 4,773,057 | 9/1988 | Otsuka et al. | 369/75.2 |
| 4,783,777 | 11/1988 | Camerik | 369/265 |
| 4,949,328 | 8/1990 | Kase et al. | 369/75.2 |
| 4,953,154 | 8/1990 | Takahara et al. | 369/75.2 |
| 4,996,680 | 2/1991 | Staar | 369/36 X |
| 5,050,159 | 9/1991 | Kenmotsu | 369/75.2 X |
| 5,097,465 | 3/1992 | Funabashi et al. | 369/199 |

*Primary Examiner*—Stuart S. Levy
*Assistant Examiner*—Paul J. Ditmyer
*Attorney, Agent, or Firm*—Sughrue, Mion, Zinn, Macpeak & Seas

[57] ABSTRACT

In a multi-disk player, disks such as compact disks and video disks are positioned on at least two tray mechanisms so that the signal reproducing surfaces of the disks on the respective tray mechanisms face in predetermined directions. Drive units are provided for each of the tray mechanisms, and each drive unit moves its the respective tray mechanism between a disk playback position and a disk ejecting position. A disk is clamped selectively from the tray mechanism which is at the disk playback position. An optical pickup device traverses the signal reproducing surface of the disk thus clamped to playback the data recorded on the surface of the clamped disk. Thus, a compact disk can be played back without removing a video disk situated in the disk player, and vice versa. Additionally, a video disk can be loaded and positioned in the disk player while playing back a compact disk, and vice versa.

20 Claims, 9 Drawing Sheets

DISK PLAYER FOR PLAYING BACK MORE THAN ONE KIND OF DISK

This is a continuation of application Ser. No. 07/650,382 filed Feb. 4, 1991, now abandoned.

BACKGROUND OF THE INVENTION

This invention relates to an improved disk player, commonly referred to as a "multi-disk player", which is capable of playing back more than one kind of disk, such as an optical disk called a "video disk" or a "compact disk", or a plurality of these disks.

In a conventional multi-disk player, a video disk 30 cm in diameter is loaded thereinto at the center of the player, and a plurality of compact disks are set on a tray, which is adapted to move the video disk from the ejecting position to the loading position, so that the compact disks are positioned on a circumference of the tray and so that their signal reproducing surfaces face in the same direction as that of the video disk. The tray is rotated when moved to the loading position, so that a compact disk, when moved over to a predetermined position, is played back; i.e., a compact disk to be played back is selected.

In the above-described conventional multi-disk player, it is impossible to load and position a compact disk on the tray during playback of the video disk, and vice versa. Therefore, after a video disk is played back and a compact disk is desired to be played back, or vice versa, the tray must be moved to the ejecting position, so as to place the disk to be played back on the tray.

Furthermore, even when a plurality of compact disks are set on the tray, and it is unnecessary to replace them, all of the compact disks must be removed temporarily when a video disk is to be played back.

SUMMARY OF THE INVENTION

Accordingly, an object of this invention is to eliminate the above-described difficulties accompanying a conventional multi-disk player.

More specifically, an object of the invention is to provide a disk player in which a compact disk can be played back without removing a previously loaded video disk from the disk player, and vice versa, and in which a video disk can be loaded and set during playback of a compact disk, and vice versa.

The foregoing and other objects, advantages, and features of the invention have been achieved by providing a disk player which, according to the invention, comprises: at least two trays on which disks are placed so that the signal reproducing surfaces of the disks face in opposite directions; loading means provided for each of the trays, each loading means moving the respective tray between a disk playback position and a disk non-playback position; clamping means for clamping a disk selectively from the trays which is at the disk playback position; and moving means for moving pickup means for reproducing signals from disks to the signal reproducing surface of the disk thus clamped.

The nature, principle and utility of the invention will become more apparent from the following detailed description when read in conjunction with the accompanying drawings.

DETAILED DESCRIPTION OF THE PREFERRED EMBODIMENT

One preferred embodiment of the invention will be described with reference to the accompanying drawings.

As shown in the Figures, a turntable 2 is rotatably mounted on a compact disk tray 1. A plurality of compact disks A (for example, five compact disks A, as shown in the embodiment) can be loaded onto the turntable 2 so as to be arranged at equal angular intervals on a circumference thereof. A video disk B is loaded on a video disk tray 3 so as to be positioned at the center of the video disk tray 3.

Figure 8:
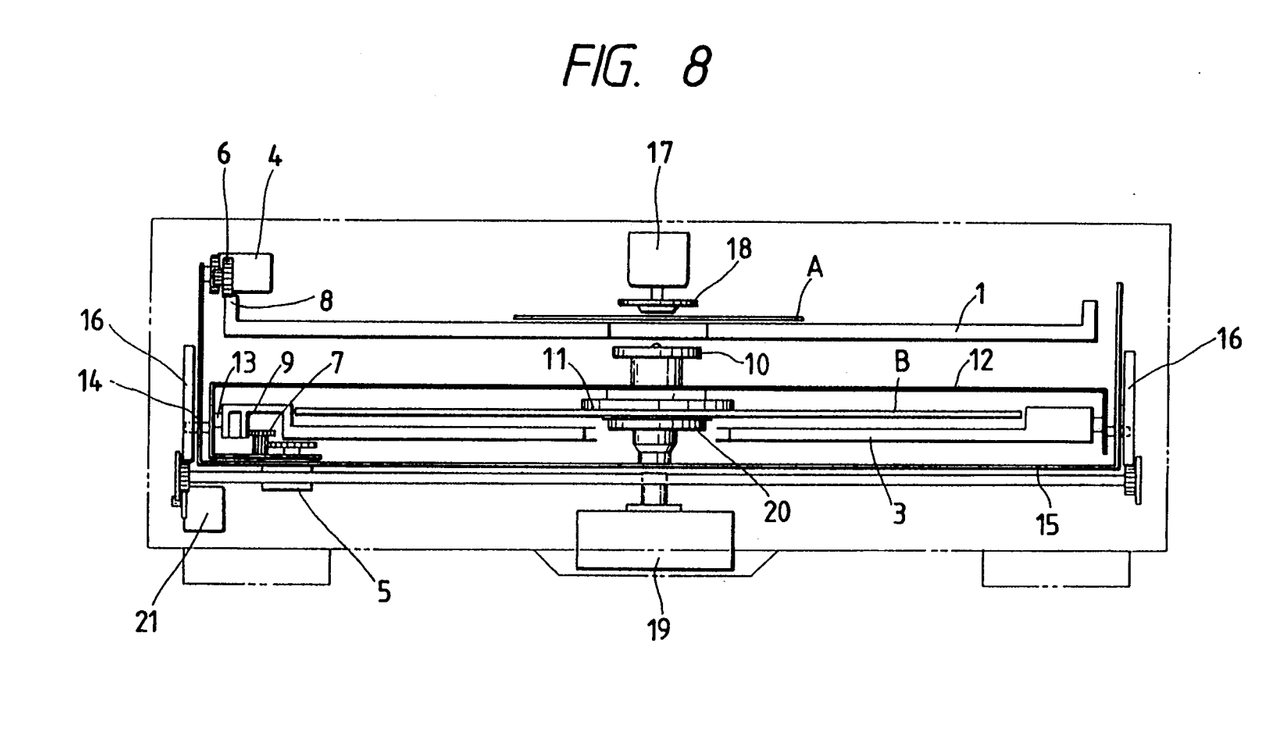

A rack 8, as shown in FIG. 8, is provided above the compact disk tray 1, and is engaged with a gear 6 driven by a drive unit 4 to move the compact disk tray 1 between a loading position and an ejecting position. Similarly, a rack 9 is provided below the video disk tray 3, and is engaged with a gear 7 driven by a drive unit 5 to move the video disk tray 3 between a loading position and an ejecting position.

Figure 9:
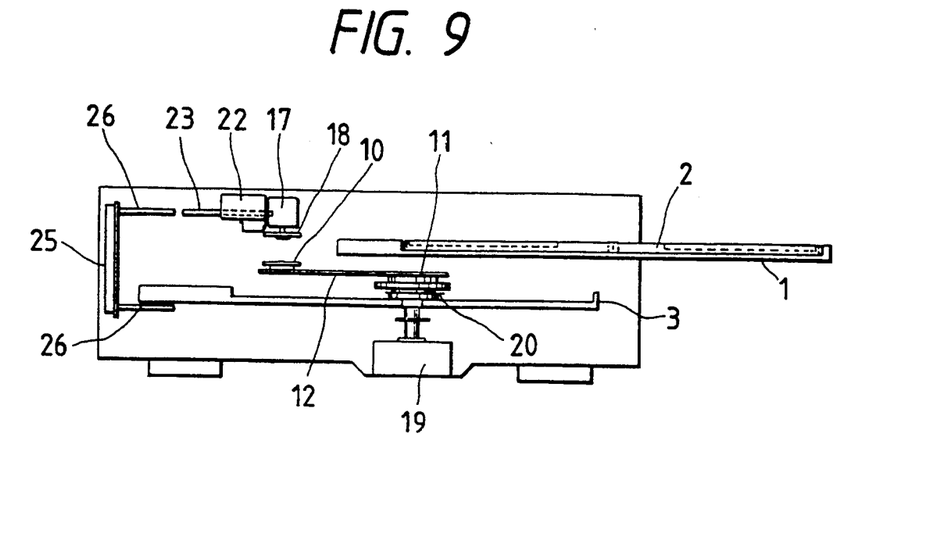
FIGS. 9 and 10 are a side view and a plan view, respectively, showing essential components of the disk player with a compact disk tray at its ejecting position.
Figure 12:
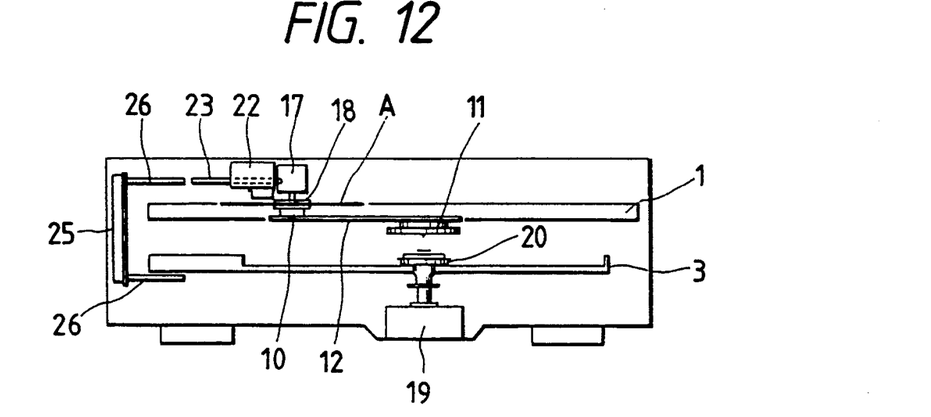

The compact disk tray 1 is moved between the ejecting position and the loading position by the drive unit 4 while being guided by a chassis (unreferenced), as shown in FIGS. 9 and 12.

Figure 1:
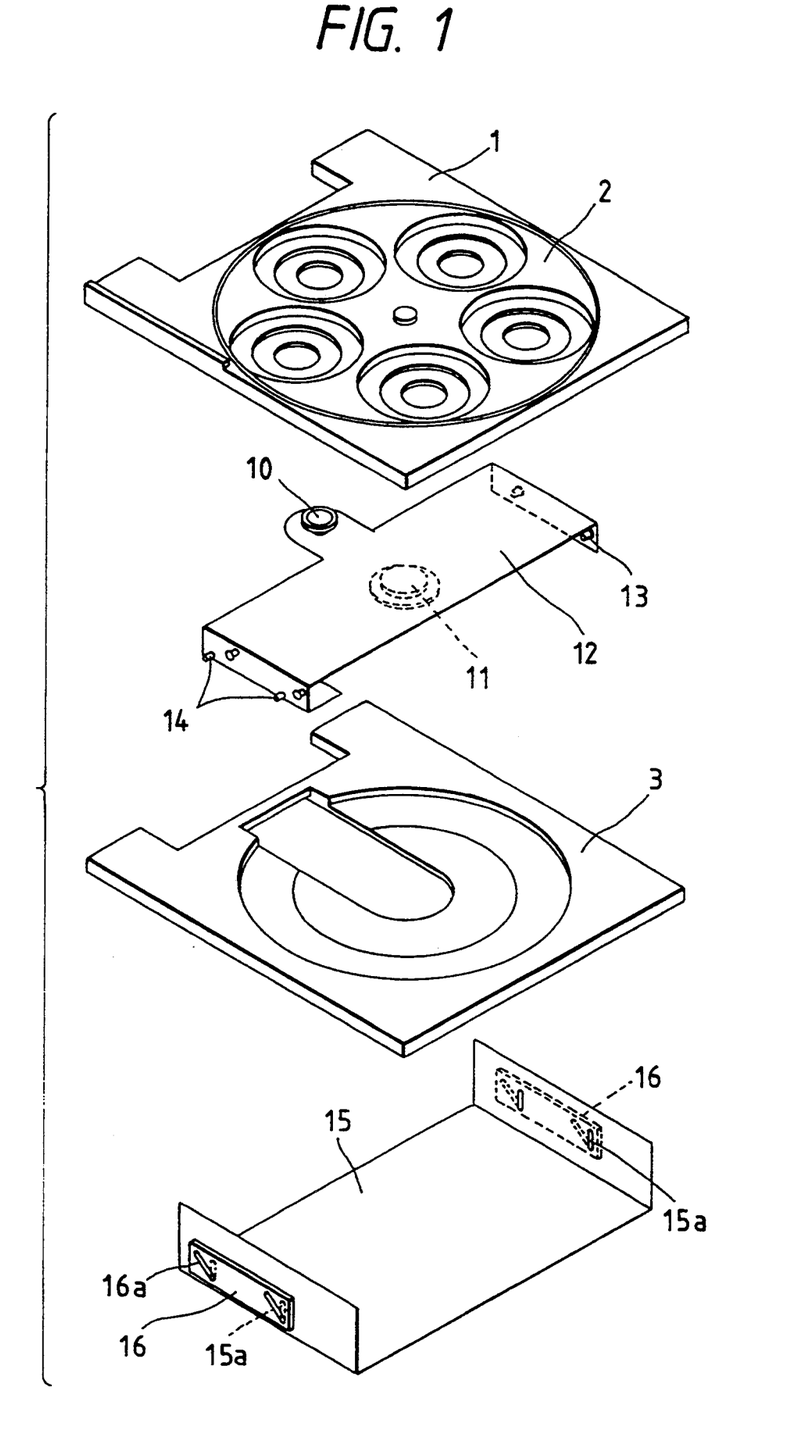
FIG. 1 is an exploded perspective view showing essential components of a disk player according to this invention.
Figure 2:
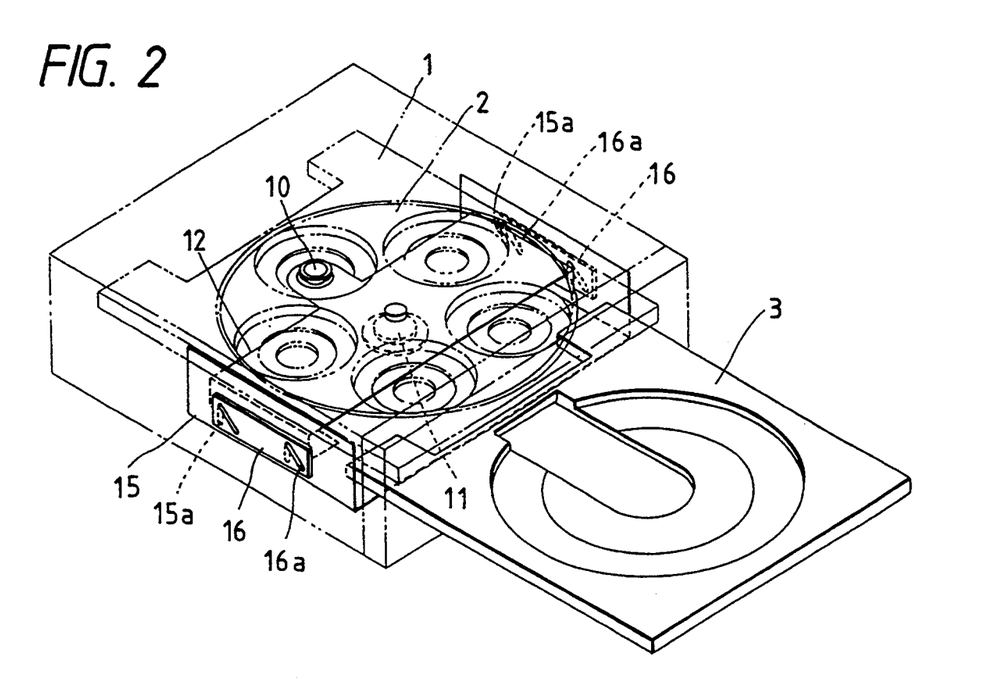
FIGS. 2, 3 and 4 are a perspective view, side view and plan view, respectively, showing essential components of the disk player with a video disk tray at its ejecting position.
Figure 3:
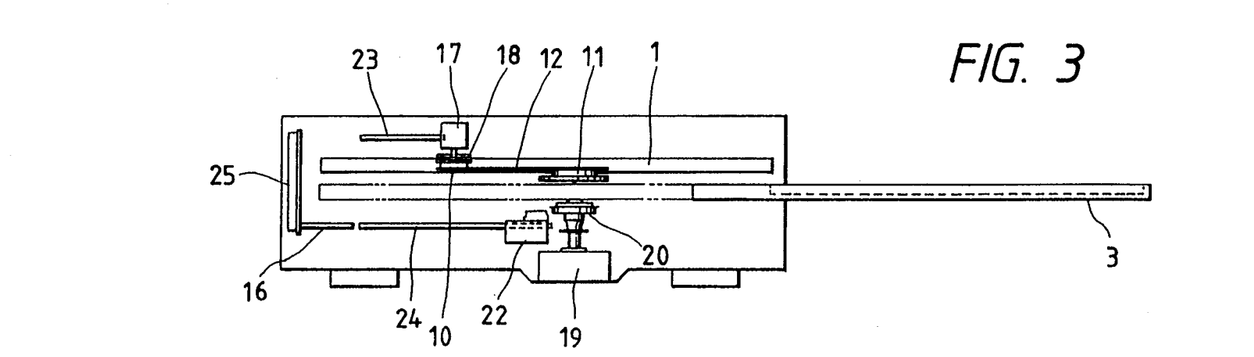
Figure 4:
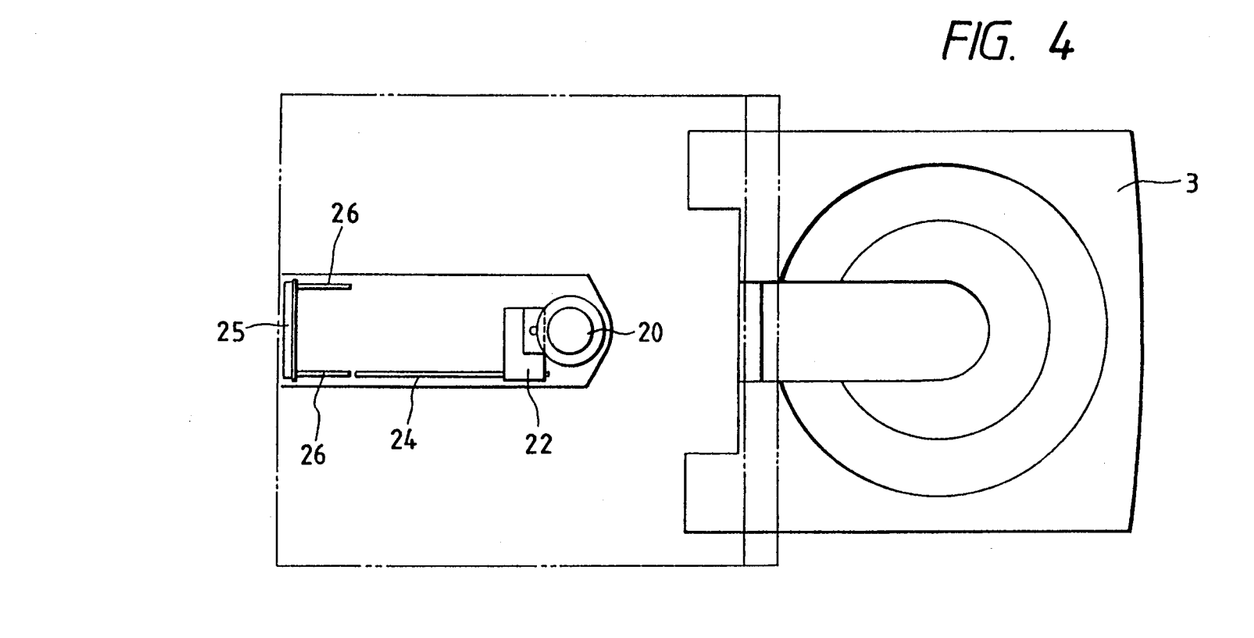
Figure 5:
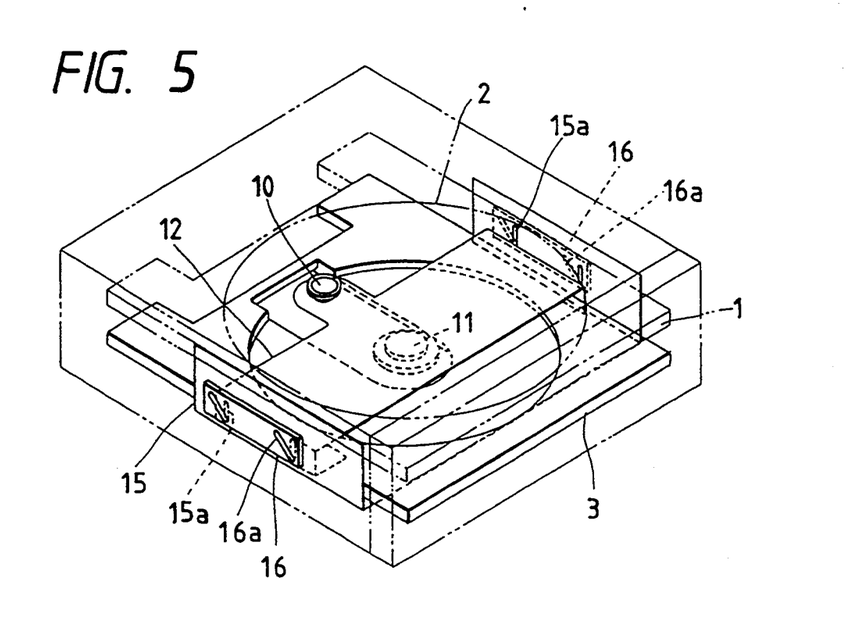
FIGS. 5, 6, 7 and 8 are a perspective view, side view, plan view, and front view, respectively, showing essential components of the disk player when a video disk is being played back.
Figure 6:
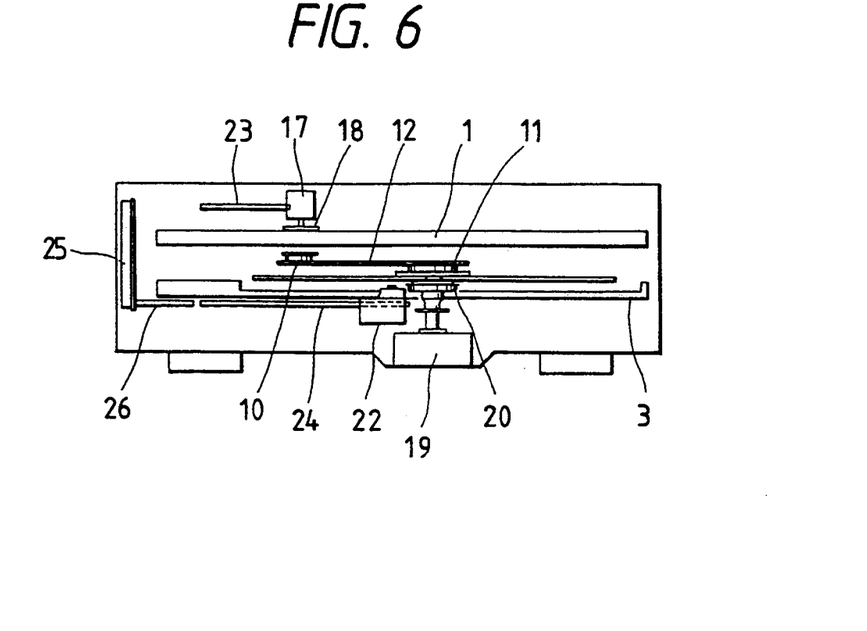
Figure 7:
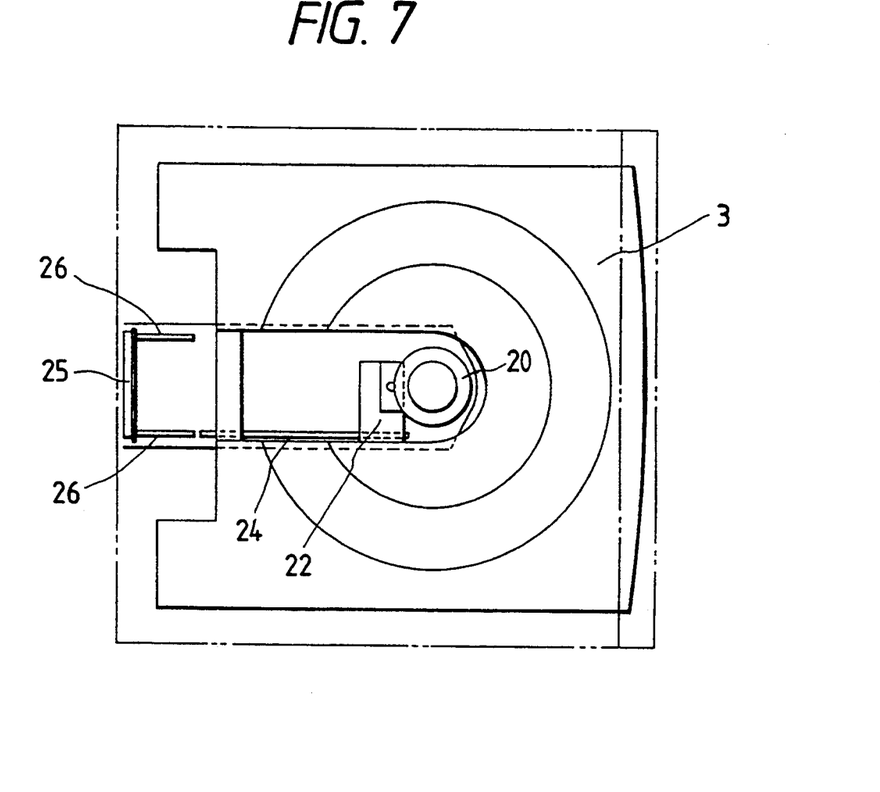

In contrast, the video disk tray 3 is moved between the ejecting position and the loading position by the drive unit 5 while being guided by guide rollers 13, as shown in FIG. 1, provided on a clamper plate 12, as shown in FIGS. 3 and 6. The clamper plate 12 has a compact disk clamper 10 on its upper surface, and a video disk clamper 11 on its lower surface.

The clamper plate 12 has pins 14, which are slidably inserted into vertical guide holes 15a formed in a base 15.

Slide plates 16 are provided on the base 15 in a well-known manner so as to be slidable horizontally. The pins 14 are further inserted into cam holes 16a formed in the slide plates 16.

A turntable 18, which is rotated by a spindle motor 17, is provided above the clamper 10 of the clamper plate 12. A turntable 20, which is rotated by a spindle motor 19, is provided below the clamper 11 of the clamper plate 12.

The slide plates 16 are moved by a drive unit 21 with respect to the base 15 in a well-known manner, so that the pins 14 inserted into the cam holes 16a are movable upwardly and downwardly along the guide holes 15a.

As the pins 14 are moved upwardly, the clamper 10 raises the compact disk A, so that compact disk A is clamped between the clamper 10 and the turntable 18.

As the pins 14 are moved downwardly, the video disk tray 3 supported on the guide rollers 13 is lowered, so that the video disk B is loaded onto the turntable 20 from the video disk tray 3, and clamped between the clamper 11 and the turntable 20.

An optical pickup 22 for reading signals from the signal recording surface of the compact disk A and the video disk B is moved over the upper surface of the compact disk A by a guide bar 23, and is moved over the lower surface of the video disk B by a guide bar 24.

The pickup 22 is transferred to a guide bar 26 of a rotary board 25 when the pickup 22 comes to the outer end of the guide bar 23. Thereafter, the rotary board 25 is rotated 180°, so that the guide bar 26 is aligned with the guide bar 24, and the pickup 22 is moved from the guide bar 26 onto the guide bar 24.

Hence, the pickup 22 is shifted from reading the upper surface of the compact disk A to reading the lower surface of the video disk B after being turned over.

Referring to FIGS. 9 through 14, the loading and the playback of the compact disk A in the disk player thus constructed will be described hereinbelow.

When an instruction is issued to eject the compact disk tray 1, the drive unit 21 moves the slide plates 16 with respect to the base 15, so that the pins 14 are moved downwardly along the guide holes 15a and the cam holes 16a. Hence, the clamper plate 12 is moved downwardly. As a result, the video disk B previously loaded in the disk player is clamped between the clamper 11 and the turntable 20.

When the instruction is issued during playback of the video disk B, the above-described operations are not performed, because the video disk has already been clamped in the above-described manner.

Figure 10:
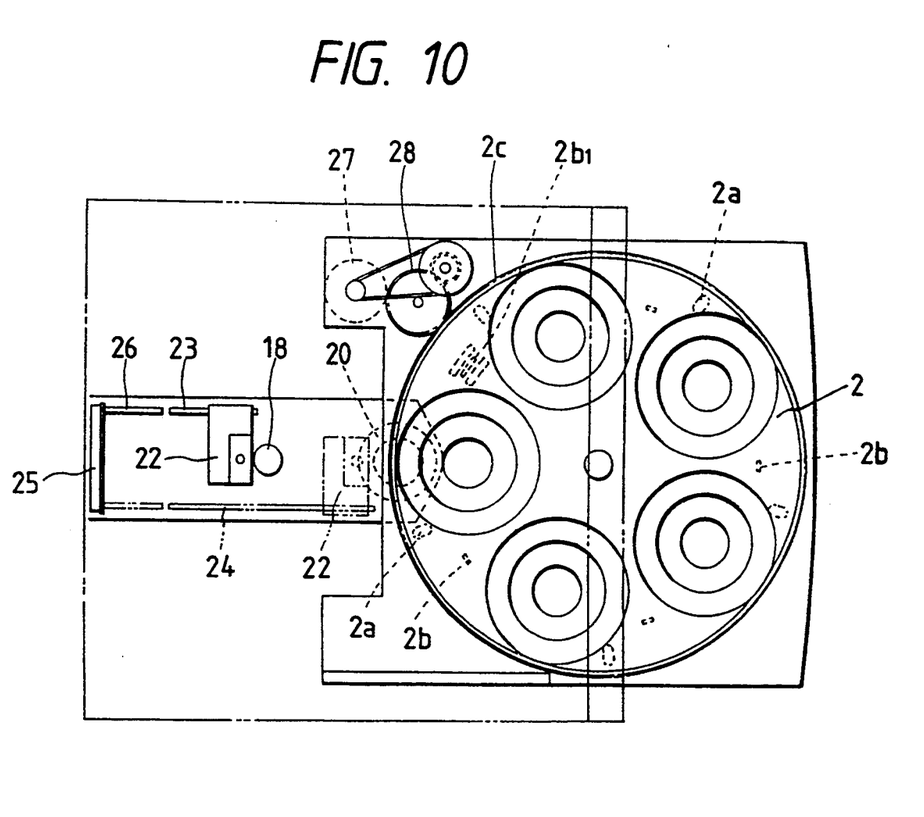
Figure 11:
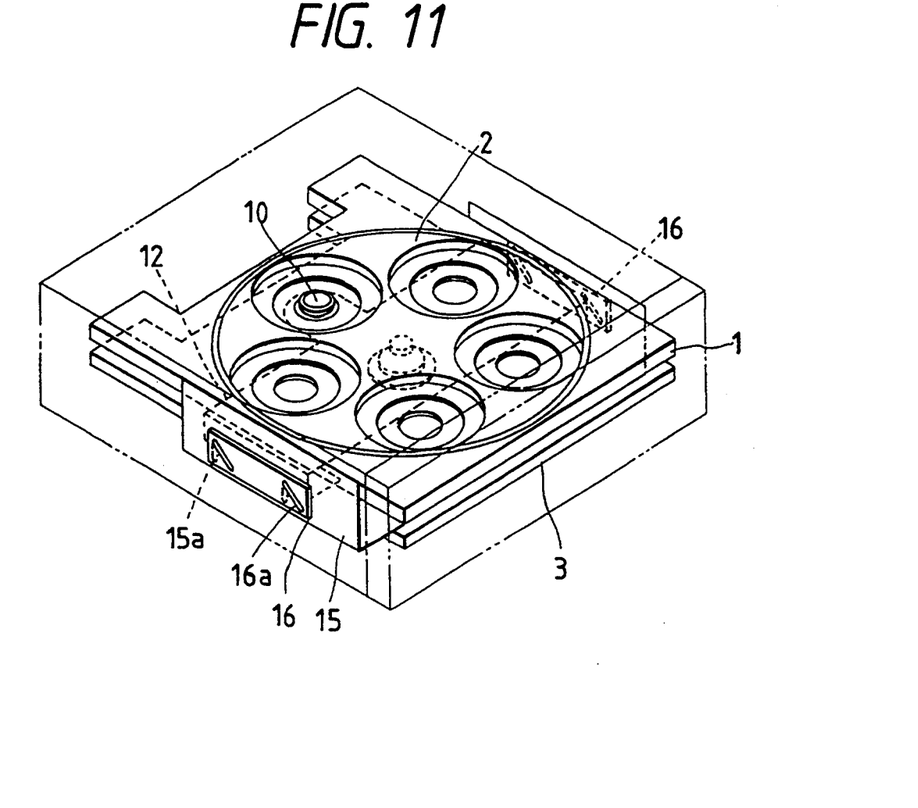
FIGS. 11, 12, 13 and 14 are a perspective view, side view, plan view, and front view, respectively, showing essential components of the disk player when a compact disk is being played back.

As the clamper plate 12 is moved downwardly, the clamper 10 moves away and separates from the turntable 18, and then the drive unit 4 is activated, so that the compact disk tray 1 is moved to the ejecting position, as shown in FIGS. 9-10, by the rack 8.

After the compact disk tray 1 has been moved to the ejecting position, one to five compact disks A are placed on the turntable 2 on the tray 1 with their signal reproducing surfaces facing upwardly.

Thereafter, an instruction is issued, and the drive unit 4 moves the compact disk tray 1 to its loading position, as shown in FIGS. 11–14.

Figure 13:
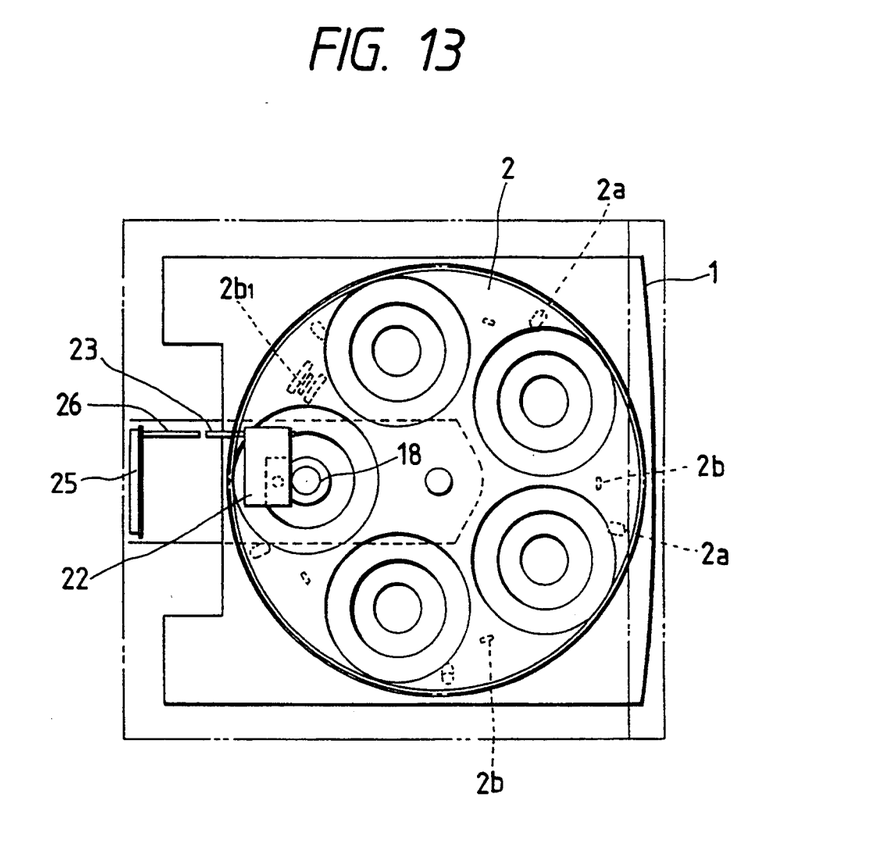
Figure 14:
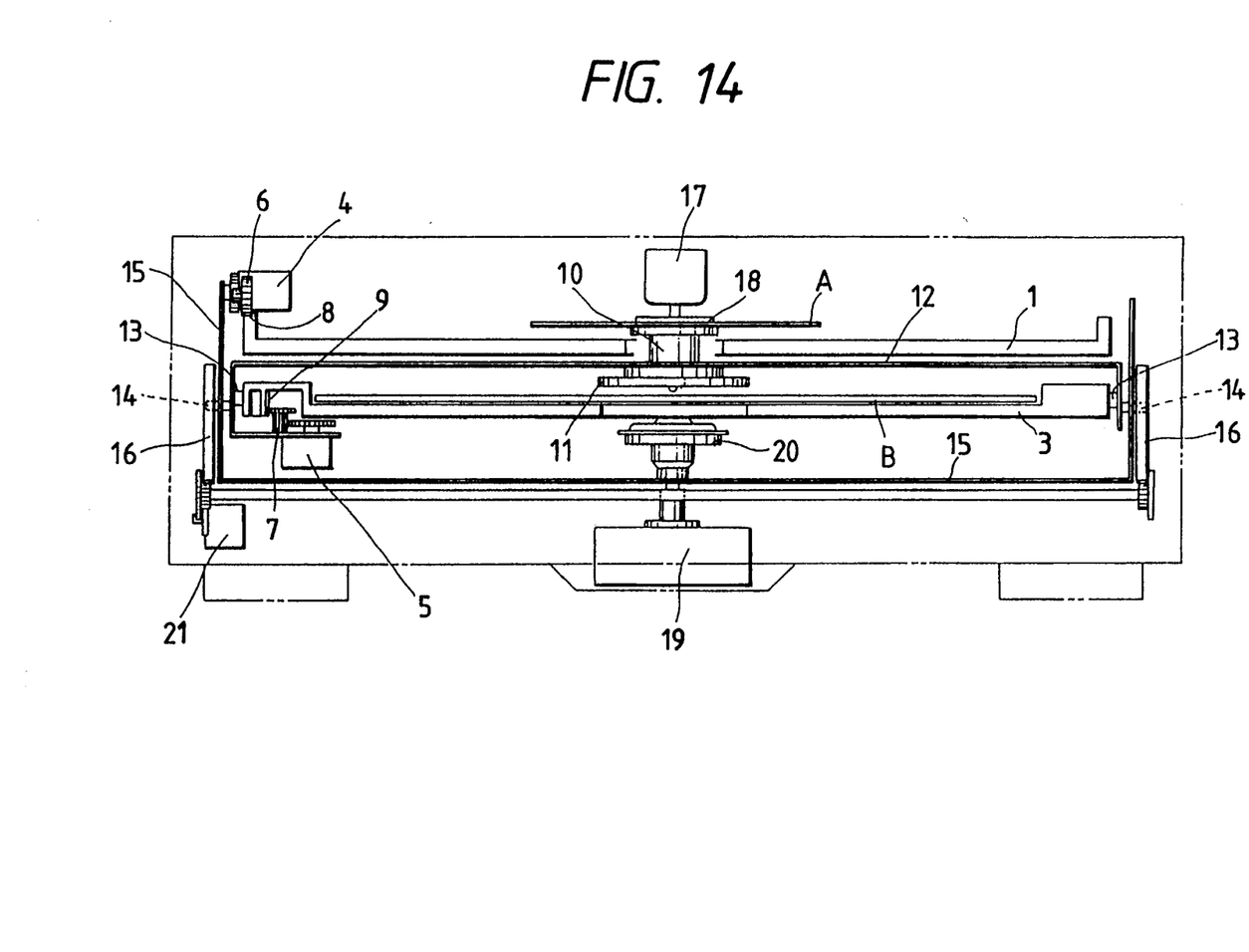

Hereinbelow and referring to FIGS. 10 and 13, one example of a device for selecting a compact disk to be played back from those loaded on the turntable 2 will be described.

The turntable 2 has five pin holes 2a and five detecting protrusions 2b corresponding to five compact disk setting regions. Stopper pins (not shown) are inserted to stop the rotation of the turntable 2. Each of the detecting protrusions 2b detects when the center of the respective compact disk setting region coincides with the center of the turntable 18.

The protrusion $2b_1$ for the compact disk setting region which is initially positioned at the turntable 18 is made larger in width, to indicate that this compact disk setting region is a home or reference position.

The periphery of the turntable 2 is formed into a gear 2c, which is engaged with a gear 28 driven by a drive unit 27, as shown in FIG. 10. When an instruction is issued to select the n-th compact disk A from the home position, the drive unit 27 rotates the turntable 2 appropriately through the gear 28.

As a result, the protrusions 2b are counted to detect the arrival of the n-th compact disk A to the turntable 18. When the n-th compact disk A is positioned at the turntable 18, the drive unit 27 stops rotating the turntable 2, and a pin is inserted into the pin hole 2a, so that the turntable 2 is fixedly secured.

The turntable 2 thus secured is released again when an ejecting instruction is issued or another compact disk A is selected, and the turntable 2 is rotated to bring the newly selected compact disk to the home position.

Thereafter, an instruction is issued to play back the compact disk A thus selected, and the drive unit 21 moves the slide plates 16, so that the pins 14 are moved upwardly along the guide holes 15a with the aid of the cam holes 16a. Hence, the clamper plate 12 is moved upwardly, and as a result the compact disk A is clamped between the clamper 10 and the turntable 18.

When the pickup 22 is at the video disk playback position, the pickup is moved along the guide bar 24 radially outwardly of the video disk B, and is transferred onto the guide bar 26 of the rotary board 25.

Thereafter, the rotary board 25 is rotated 180°, so that the guide bar 26 is aligned with the guide bar 23, and the pickup 22 is moved over to the guide bar 23. Thus, the playback of the desired compact disk A is performed by the pickup 22.

When an instruction is issued to eject the video disk tray 3 during or after playback of the compact disk A, and if the video disk B is clamped by the clamper 11, then similarly to the above-described operation, the slide plates 16 are slidably moved to raise the clamper plate 12 to release the video disk B.

If, on the other hand, the compact disk A is clamped by the clamper 10, the above-described operation is omitted, and instead the drive unit 5 merely moves the video disk tray 3 to the ejecting position.

When another video disk B is placed on the video disk tray 3, and a loading instruction is issued, the tray loading operation is performed, and the drive unit 21 lowers the clamper plate 12 through the slide plates 16. Consequently, as the clamper plate 12 is lowered, the video disk tray 3 also is lowered, so that the video disk B is clamped between the clamper 11 and the turntable 20. Thereafter, the pickup 22 is moved from the guide bar 23 to the guide bar 24, and then the pickup 22 is turned over as the rotary board 25 is rotated 180°. Thus, signals are reproduced from the video disk B by the pickup 22.

In the above-described embodiment, a video disk and a plurality of compact disks are selectively played back. However, if another compact disk tray 1 is employed instead of the video disk tray 3, then the number of compact disks to be played back by the disk player can be doubled.

Alternatively, if another video disk tray 3 is employed instead of the compact disk tray 1, then two video disks B can be played back by the disk player.

Additionally, instead of the compact disk tray 1, a disk accommodating magazine in a so-called "magazine-type compact disk player" may be employed in which a plurality of compact disks are accommodated, and which are played back one after another. Thus, instead of the drive unit 4, a mechanism for conveying the disk accommodating magazine and a mechanism for pulling the tray out from the disk accommodating magazine may be utilized.

As described above, disks to be played back are placed on the two trays of the disk player so that the signal reproducing surface of the disk or disks on one of the trays and that of the disk or disks on the second tray confront each other or are set back-to-back, and the disks are selectively played back. Therefore, while a disk on one of the trays is being played back, the second tray may be moved to the ejecting position for replacement of a disk situated thereon.

Thus, to load and play back a video disk, a compact disk or disks which do not need to be replaced are not required to be pulled out of a tray of the disk player. Thus, the playback of a video disk is not interrupted. Hence, with the invention, replacing a disk is achieved easily.

The signal reproducing pickup is designed to rotate so as to reproduce signals from the signal reproducing surfaces of the compact and video disks positioned on their respective trays. Therefore, providing a signal reproducing pickup device for each of the trays is unnecessary, and a common pickup device may be employed, thereby reducing the manufacturing cost of the disk player.

While a preferred embodiment of this invention has been described above, it will be obvious to those skilled in the art that various changes and modifications may be made therein without departing from the invention, and that thus the appended claims are intended to cover all such changes and modifications which fall within the true spirit and scope of the invention.

What is claimed is:

1. A disk player, comprising:
   at least two tray means for positioning disks having signal reproducing surfaces so that said signal reproducing surfaces of said disks face in predetermined directions;
   loading means provided for each of said at least two tray means, each of said loading means moving a respective tray means between a disk playback position and a disk non-playback position;
   driven turntable means for rotating disks;
   clamping means for clamping selectively a disk, in cooperation with said driven turntable means, which is at said disk playback position from said at least two tray means, said clamping means comprising a clamper plate having first and second sides including a first clamping member on said first side and a second clamping member on said second side;
   pickup means for reproducing signals from a signal reproducing surface of said disk at said playback position; and
   moving means for moving said pickup means over to said signal reproducing surface of said disk thus clamped.

2. A disk player according to claim 1, wherein said clamping means has pins formed thereon, and wherein said disk player further comprises a slide plate and a base having guide holes formed therein coupled to said slide plate by said pins slidably inserted in said guide holes of said base.

3. A disk player according to claim 1, wherein each of said loading means comprises a gear and a rack coupled to said respective tray means, and a drive means for driving said gear.

4. A disk player according to claim 1, wherein said moving means comprises a rotary board, a first guide bar coupled thereto, and a drive means for driving said rotary board so as to rotate said first guide bar.

5. A disk player according to claim 4, wherein said rotary board is selectively connected to said pickup means and is rotated 180°, so as to rotate said pickup means 180° and move said pickup means to said signal reproducing surface of said disk thus clamped.

6. A disk player according to claim 1, wherein said pickup means comprises a signal reproducing pickup common to said at least two tray means.

7. A disk player according to claim 1, wherein said moving means turns said pickup means over so as to be shifted from an upper surface of a first disk to a lower surface of a second disk.

8. A disk player according to claim 1, wherein said signal reproducing surfaces of said disks face in opposite directions.

9. A disk player according to claim 1, wherein said signal reproducing surfaces of said disks face each other.

10. A disk player according to claim 1, wherein said at least two tray means are each for holding a video disk.

11. A disk player according to claim 1, wherein said at least two trays are each for holding a plurality of compact disks.

12. A disk player according to claim 1, wherein said at least two tray means include a disk accommodating magazine.

13. A disk player, comprising:
    at least two tray means for positioning disks having signal reproducing surfaces so that said signal reproducing surfaces of said disks face in predetermined directions;
    loading means provided for each of said at least two tray means, each of said loading means moving a respective tray means between a disk playback position and a disk non-playback position;
    clamping means for clamping selectively a disk which is at said disk playback position from said at least two tray means;
    pickup means for reproducing signals from a signal reproducing surface of said disk at said playback position; and
    moving means for moving said pickup means over to said signal reproducing surface of said disk thus clamped;
    said clamping means having pins formed thereon, wherein said disk player further comprises a slide plate and a base having guide holes formed therein coupled to said slide plate by said pins slidably inserted in said guide holes of said base, said clamping means comprising a clamper plate, and
    wherein said clamper plate includes a first clamper, on a first surface, for clamping a disk on a first of said at least two tray means, and a second clamper, on a second surface, for clamping a disk on a second of said at least two tray means.

14. A disk player, comprising:
    at least two tray means for positioning disks having signal reproducing surfaces so that said signal reproducing surfaces of said disks face in predetermined directions;

loading means provided for each of said at least two tray means, each of said loading means moving a respective tray means between a disk playback position and a disk non-playback position;

clamping means for clamping selectively a disk which is at said disk playback position from said at least two tray means;

pickup means for reproducing signals from a signal reproducing surface of said disk at said playback position; and moving means for moving said pickup means over to said signal reproducing surface of said disk thus clamped;

wherein said moving means comprises a rotary board, a first guide bar coupled thereto, and a drive means for driving said rotary board so as to rotate said first guide bar, wherein said moving means further comprises second and third guide bars, said first guide bar being aligned with said second guide bar when said upper surface of a first disk is being traversed by said pickup means and said first guide bar being aligned with said third guide bar when a lower surface of a second disk is being traversed.

15. A disk player comprising:

at least two tray means for positioning disks having signal reproducing surfaces so that said signal reproducing surfaces of said disks face in predetermined directions;

loading means provided for each of said at least two tray means, each of said loading means moving a respective tray means between a disk playback position and a disk non-playback position;

clamping means for clamping selectively a disk which is at said disk playback position from said at least two tray means, said clamping means comprising a clamper plate having first and second sides including a first clamping member on said first side and a second clamping member on said second side, said clamping means having pins formed thereon;

a slide plate and a base having guide holes formed therein coupled to said slide plate by said pins slidably inserted in said guide holes of said base;

pickup means for reproducing signals from a signal reproducing surface of said disk at said playback position; and moving means for moving said pickup means over to said signal reproducing surface of said disk thus clamped.

16. A disk player according to claim 15, wherein said base has slide plates formed thereon, said slide plates having cam holes formed therein, and wherein said slide plates are slidably movable with respect to said base.

17. A disk player according to claim 16, wherein said pins being movably positioned in said cam holes of said slide plates and said guide holes of said base.

18. A disk player according to claim 16, wherein said clamping means is one of raised and lowered to release said disk thus clamped when said slide plates are slid in a predetermined direction.

19. A disk player according to claim 15, wherein said guide holes in said base are perpendicular to a loading direction of said disks.

20. A disk player according to claim 15, wherein said pins are moved upwardly when a first disk is to be clamped, and said pins are moved downwardly when a second disk is to be clamped.

* * * * *